(12) United States Patent
Pack et al.

(10) Patent No.: US 11,654,663 B2
(45) Date of Patent: May 23, 2023

(54) POLYMER-METAL SANDWICH STRUCTURE HAVING IN SITU-FORMED FLAME RETARDANT AND METHOD OF MANUFACTURING THE SAME

(71) Applicant: GM GLOBAL TECHNOLOGY OPERATIONS LLC, Detroit, MI (US)

(72) Inventors: Seongchan Pack, West Bloomfield Township, MI (US); Venkateshwar R. Aitharaju, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/340,251

(22) Filed: Jun. 7, 2021

(65) Prior Publication Data
US 2022/0388290 A1    Dec. 8, 2022

(51) Int. Cl.
| | |
|---|---|
| B32B 27/18 | (2006.01) |
| B32B 7/10 | (2006.01) |
| B32B 15/08 | (2006.01) |
| B32B 27/08 | (2006.01) |
| B32B 37/06 | (2006.01) |
| B32B 37/14 | (2006.01) |

(52) U.S. Cl.
CPC ............. *B32B 27/18* (2013.01); *B32B 7/10* (2013.01); *B32B 15/08* (2013.01); *B32B 27/08* (2013.01); *B32B 37/06* (2013.01); *B32B 37/144* (2013.01); *B32B 2250/03* (2013.01); *B32B 2255/06* (2013.01); *B32B 2255/205* (2013.01); *B32B 2307/3065* (2013.01)

(58) Field of Classification Search
None
See application file for complete search history.

(56) References Cited

U.S. PATENT DOCUMENTS

| | | | | |
|---|---|---|---|---|
| 6,270,560 B1 * | 8/2001 | Kleiner | ................. | C09K 21/12 524/121 |
| 2016/0172074 A1 * | 6/2016 | Stoppelmann | .......... | C08L 77/06 428/458 |
| 2020/0234844 A1 * | 7/2020 | Adachi | ............... | H01B 7/0807 |

* cited by examiner

Primary Examiner — Ramsey Zacharia
(74) Attorney, Agent, or Firm — Quinn IP Law

(57) ABSTRACT

A polymer-metal sandwich structure includes a first layer made of a polymer and having a first bonding surface, a second layer made of a metal and having a second bonding surface, and a third layer sandwiched between and in contact with the first and second bonding surfaces. The first layer contains or is capable of liberating anions of a first ion type at the first bonding surface, the second layer contains or is capable of liberating cations of a second ion type at the second bonding surface, and the third layer is made of a flame retardant formed of anions of the first ion type and cations of the second ion type. A method of manufacturing the polymer-metal sandwich structure is also provided.

18 Claims, 7 Drawing Sheets

POLYMER-METAL SANDWICH STRUCTURE HAVING IN SITU-FORMED FLAME RETARDANT AND METHOD OF MANUFACTURING THE SAME

INTRODUCTION

This disclosure relates generally to polymer-metal sandwich structures having in situ flame retardants formed therein, and to methods of manufacturing such polymer-metal sandwich structures.

In some environments, components may be used which have the potential of producing sparks, high concentrations of heat or the like, which may serve as potential ignition sources. To retard or prevent the initiation or spread of flames in such environments, components may be coated with a chemical flame retardant. Alternatively, the components may have a flame retardant mixed into the material (e.g., polymer) from which the components are made.

SUMMARY

According to one embodiment, a polymer-metal sandwich structure includes: a first layer made of a polymer and having a first bonding surface, wherein the first layer contains or is capable of liberating anions of a first ion type at the first bonding surface; a second layer made of a metal and having a second bonding surface, wherein the second layer contains or is capable of liberating cations of a second ion type at the second bonding surface; and a third layer sandwiched between and in contact with the first and second bonding surfaces, wherein the third layer is made of a flame retardant formed of anions of the first ion type and cations of the second ion type.

The flame retardant may be formed by sandwiching together the first and second layers with the first and second bonding surfaces disposed in contact with each other and applying heat to the first and/or second layers so as to elevate the temperature of the first bonding surface to at least the melting temperature of the polymer. The flame retardant may be effective for preventing and/or slowing an ignition and/or a spreading of a flame within and/or through at least one of the first and second layers.

The first ion type may be at least one of $PO_4^{3-}$, $SO_4^{2-}$, $OH^-$, $(CH_3)PO_4^{2-}$, $SnO_3^{2-}$, $SnO_4^{4-}$, $SiO_3^{2-}$, $SiO_4^{4-}$ and $SiO_5^{6-}$. The second ion type may be at least one of $Zn^{2+}$, $Al^{3+}$, $Mg^{2+}$, $Ni^{2+}$, $Ni^{3+}$, $Mo^{3+}$ and $Cu^{2+}$. The flame retardant may be at least one of $Zn_3(PO_4)_2$, $Zn_3(SO_4)_2$, $Zn(OH)_2$, $Zn(CH_3)PO_4$, $ZnSnO_3$, $Zn_2SnO_4$, $Zn_2SiO_4$, $AlPO_4$, $Al_2(SO_4)_3$, $Al(OH)_3$, $Al_2(CH_3PO_4)_3$, $Al_2(SnO_3)_3$, $Al_4(SnO_4)_3$, $Al_2SiO_5$, $Mg_3(PO_4)_2$, $MgSO_4$, $Mg(OH)_2$, $Mg(CH_3)PO_4$, $MgSnO_3$, $Mg_2SnO_4$, $Mg_2SiO_4$, $Ni_3(PO_4)_2$, $NiPO_4$, $NiSO_4$, $Ni_2(SO_4)_3$, $Ni(OH)_2$, $Ni(OH)_3$, $Ni(CH_3)PO_4$, $Ni_2(CH_3PO_4)_3$, $NiSnO_3$, $Ni_2(SnO_3)_3$, $Ni_2SnO_4$, $Ni_4(SnO_4)_3$, $NiSiO_3$, $Ni_2SiO_4$, $MoPO_4$, $Mo_2(SO_4)_3$, $Mo(OH)_3$, $Mo_2(CH_3PO_4)_3$, $Mo_2(SnO_3)_3$, $Mo_4(SnO_4)_3$, $Mo_4(SiO_4)_3$, $Cu_3(PO_4)_2$, $CuSO_4$, $Cu(OH)_2$, $Cu(CH_3)PO_4$, $CuSnO_3$, $Cu_2SnO_4$ and $Cu_2SiO_4$.

The metal may be at least one of zinc, aluminum, magnesium, nickel, molybdenum and copper. The polymer-metal sandwich structure may further include an electron donor additive dispersed within a first bonding volume of the first layer extending from the first bonding surface to a first depth into the first layer, wherein the electron donor additive contains or is capable of liberating anions of the first ion type. The polymer-metal sandwich structure may further include a fourth layer made of a second polymer, wherein the fourth layer is bonded with the first layer and is configured as a first structural member. Optionally, the second polymer of the fourth layer may be the same as the polymer of the first layer. The polymer-metal sandwich structure may further include a fifth layer made of a second metal, wherein the fifth layer is bonded with the second layer and is configured as a second structural member. Optionally, the second metal of the fifth layer may be the same as the metal of the second layer. In any of the foregoing configurations, the polymer-metal sandwich structure may be configured as at least one of (i) a support tray, (ii) one or more walls, and (iii) a lid.

According to another embodiment, a polymer-metal sandwich structure includes: (i) a first layer made of a polymer and having a first bonding surface, wherein an electron donor additive containing or capable of liberating anions of a first ion type is disposed within a first bonding volume of the first layer extending from the first bonding surface to a first depth into the first layer, wherein the first ion type is at least one of a phosphate, a sulfate, a hydroxide, a methyl phosphate, a metastannate, an orthostannate, a tricoordinated silicate, a tetracoordinated silicate and a pentacoordinated silicate; (ii) a second layer made of a metal and having a second bonding surface, wherein the second layer contains or is capable of liberating cations of a second ion type at the second bonding surface, wherein the second ion type is at least one of a zinc(II) cation, an aluminum(III) cation, a magnesium(II) cation, a nickel (II) cation, a nickel (III) cation, a molybdenum (III) cation and a copper (II) cation; and (iii) a third layer sandwiched between and in contact with the first and second bonding surfaces, wherein the third layer is made of a flame retardant formed of anions of the first ion type and cations of the second ion type.

The flame retardant may be at least one of zinc(II) phosphate, zinc(II) sulfate, zinc(II) hydroxide, zinc(II) methyl phosphate, zinc(II) metastannate, zinc(II) orthostannate, zinc(II) silicate, aluminum(III) phosphate, aluminum (III) sulfate, aluminum(III) hydroxide, aluminum(III) methyl phosphate, aluminum(III) metastannate, aluminum (III) orthostannate, aluminum(III) silicate, magnesium(II) phosphate, magnesium(II) sulfate, magnesium(II) hydroxide, magnesium(II) methyl phosphate, magnesium(II) metastannate, magnesium(II) orthostannate, magnesium(II) silicate, nickel(II) phosphate, nickel(III) phosphate, nickel (II) sulfate, nickel(III) sulfate, nickel(II) hydroxide, nickel (III) hydroxide, nickel(II) methyl phosphate, nickel(III) methyl phosphate, nickel(II) metastannate, nickel(III) metastannate, nickel(II) orthostannate, nickel(III) orthostannate, nickel(II) silicate, nickel(III) silicate, molybdenum(III) phosphate, molybdenum(III) sulfate, molybdenum(III) hydroxide, molybdenum(III) methyl phosphate, molybdenum(III) metastannate, molybdenum(III) orthostannate, molybdenum(III) silicate, copper(II) phosphate, copper(II) sulfate, copper(II) hydroxide, copper(II) methyl phosphate, copper(II) metastannate, copper(II) orthostannate, and copper(II) silicate.

According to yet another embodiment, a method of manufacturing a polymer-metal sandwich structure includes: (i) sandwiching together a first layer of polymer and a second layer of metal, such that a first bonding surface of the first layer is disposed in contact with a second bonding surface of the second layer, wherein the polymer contains or is capable of liberating anions of a first ion type at the first bonding surface and the metal contains or is capable of liberating cations of a second ion type at the second bonding surface; (ii) applying heat to the first and/or second layers so as to elevate the temperature of the first bonding surface to at least the melting temperature of the polymer; and (iii) forming, from the applied heat, a third layer of flame retardant from anions of the first ion type and cations of the second ion type between the first and second bonding surfaces.

The method may further include bonding a fourth layer made of a second polymer to the first layer, wherein the fourth layer is configured as a first structural member. The method may further include adding a fifth layer made of a second metal to the second layer, wherein the fifth layer is coated or plated onto the second layer and is configured as a second structural member. The method may further include dispersing an electron donor additive within a first bonding volume of the first layer extending from the first bonding surface to a first depth into the first layer, wherein the electron donor additive contains or is capable of liberating anions of the first ion type. A polymer-metal sandwich structure produced by the foregoing method is also claimed.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 6:
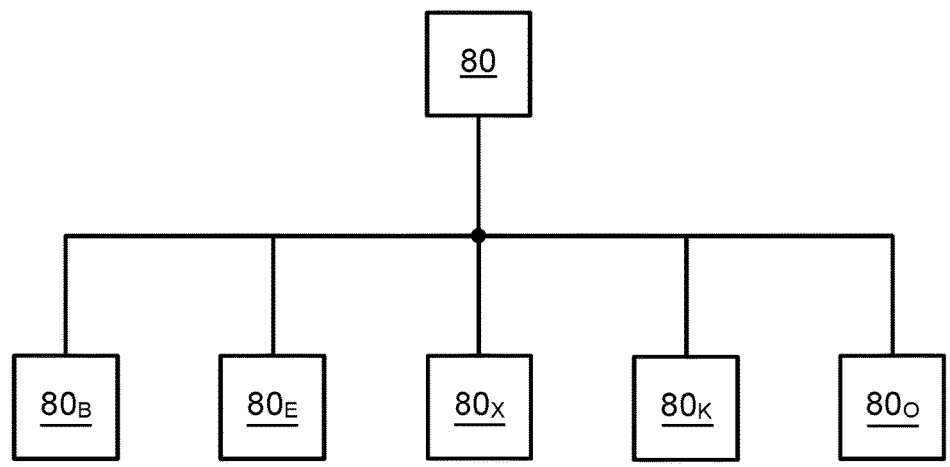
FIG. 6 is a block diagram showing various embodiments of a heat-sensitive and/or flame-sensitive first object.

Note that certain reference numerals in the drawings have subscripts, such as first objects $80_B$, $80_E$, $80_X$, $80_K$ and $80_O$ of FIG. 6. Subscripts are used in the drawings and in the present description to refer to individual elements, individual embodiments or individual types of elements or embodiments (such as the aforementioned first objects), while the use of reference numerals without subscripts may refer to the collective group of such elements, embodiments or types of elements or embodiments, and/or to a singular but generic one of such elements, embodiments or types of elements or embodiments. Thus, reference numeral $80_B$ (with the subscript) may refer to a specific first object or to a specific type or embodiment of first object, while reference numeral 80 (without the subscript) may refer to all the first objects, the group of first objects, or a singular but generic first object (i.e., any first object).

DETAILED DESCRIPTION

Referring now to the drawings, wherein like numerals indicate like parts in the several views, a polymer-metal sandwich structure 20, and a method 100 of manufacturing the polymer-metal sandwich structure 20, are shown and described herein.

Figure 1:
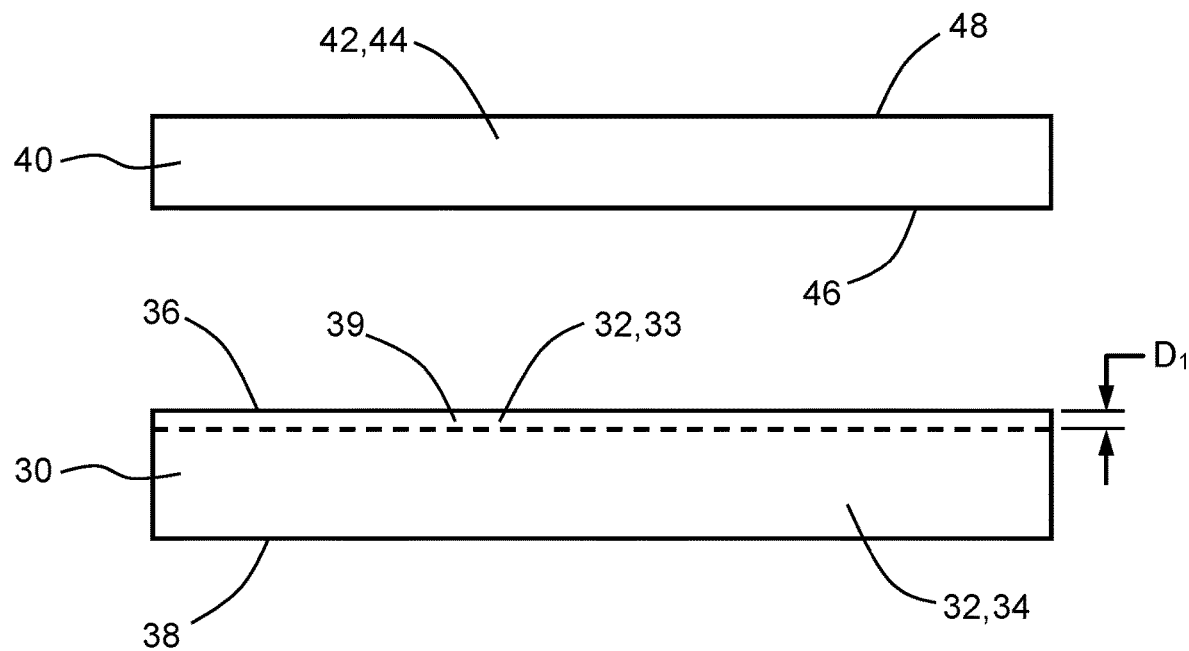
FIG. 1 is a schematic side view of a first layer made of a polymer and a second layer made of a metal prior to being sandwiched together.
Figure 2:
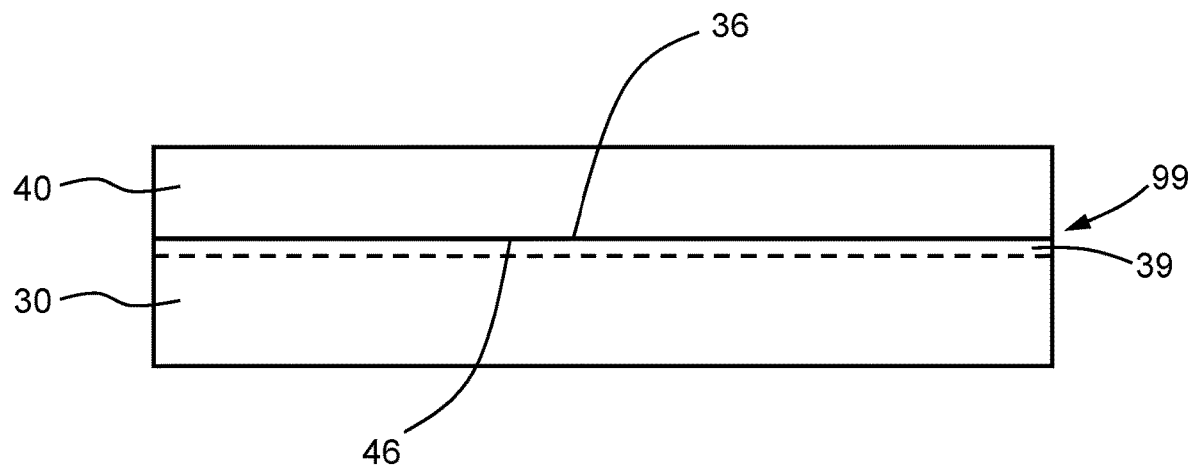
FIG. 2 is a schematic side view of the first and second layers of FIG. 1 after being sandwiched together.
Figure 3:
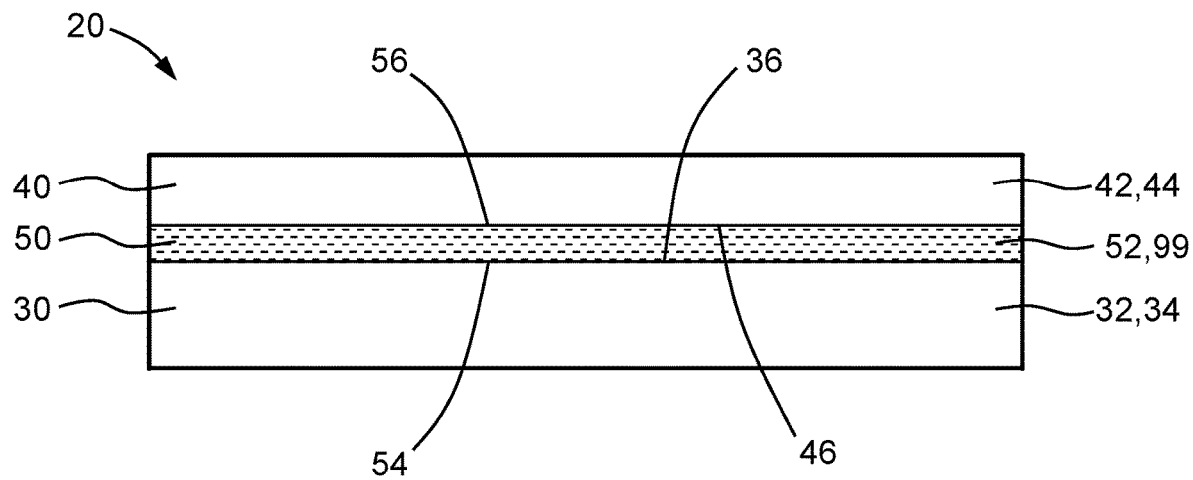
FIG. 3 is a schematic side view of the first and second layers of FIG. 2 after an addition of heat sufficient to form a third in situ layer of flame retardant, thereby producing a polymer-metal sandwich structure.

FIGS. 1-3 show schematic side views of a first layer 30 made of a polymer 32 and a second layer 40 made of a metal 42, with FIG. 1 showing the first and second layers 30, 40 prior to being sandwiched together, FIG. 2 showing the first and second layers 30, 40 after being sandwiched together, and FIG. 3 showing the first and second layers 30, 40 after an addition of heat sufficient to form a third "in situ" layer 50 of flame retardant 52, thereby producing a polymer-metal sandwich structure 20 according to the present disclosure. The third layer 50 of flame retardant 52 is described as being "in situ" because it is produced "in place", by bringing together the first and second layers 30, 40 in contact with each other and applying heat to produce the third layer 50 in place at the interface 99 where the first and second layers 30, 40 meet, without the need for depositing, interposing or otherwise placing the third layer 50 of flame retardant 52 between the two layers 30, 40. This is because anions of the first type 34 from the first layer 30 combine with cations of the second type 44 from the second layer 40 when sufficient heat is applied to the interface 99 between the two sandwiched layers 30, 40.

Figure 8:
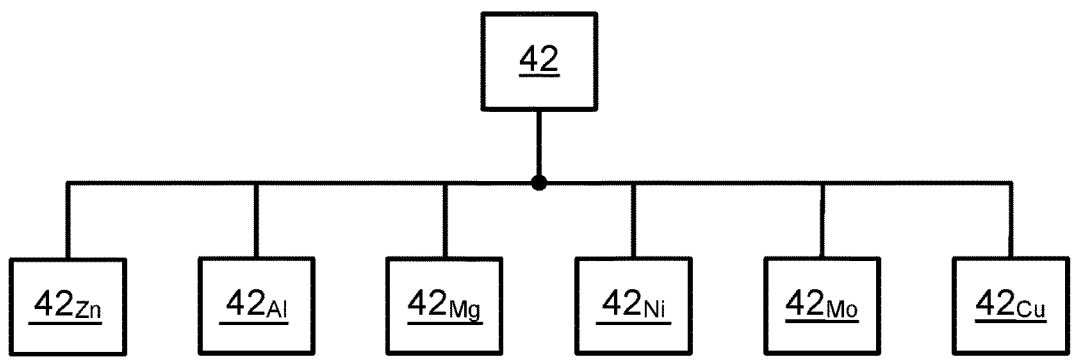
FIG. 8 is a block diagram showing various metals of which the second layer may be made.

The first layer 30 has a first bonding surface 36 and a first non-bonding surface 38 opposed to the first bonding surface 36, and the second layer 40 has a second bonding surface 46 and a second non-bonding surface 48 opposed to the second bonding surface 46. The polymer 32 of which the first layer 30 is made may be any suitable thermoplastic or thermoset material. For example, the polymer 32 may be a polyamide (PA), a polyamide-imide (PAI), a polyether ether ketone (PEEK) or the like which may be injection molded, or a phenolic or other thermoset material which may be transfer molded. (The polymer 32 may also optionally include reinforcing fillers, such as fiberglass, carbon fiber, aramid, etc.) As illustrated by FIG. 8, the metal 42 of which the second layer 40 is made may be at least one of zinc $42_{Zn}$, aluminum $42_{Al}$, magnesium $42_{Mg}$, nickel $42_{Ni}$, molybdenum $42_{Mo}$ and copper $42_{Cu}$.

The first layer 30 (and/or the polymer 32) is selected, blended, formulated or configured such that it contains anions of a first ion type 34 at the first bonding surface 36, and/or is capable of liberating anions of the first ion type 34 at the first bonding surface 36. These anions of the first ion type 34 may be available in free ionic/anionic form within the first layer/polymer 30, 32, or they may be in combined/compound form (i.e., combined with cations) but with the capability of being liberated into ionic/anionic form via the application of heat. These anions of the first ion type 34 are disposed such that they are at least at or very near the first bonding surface 36 of the first layer 30, but they may also be disposed or dispersed throughout some or all of the thickness of the first layer 30.

Figure 7:
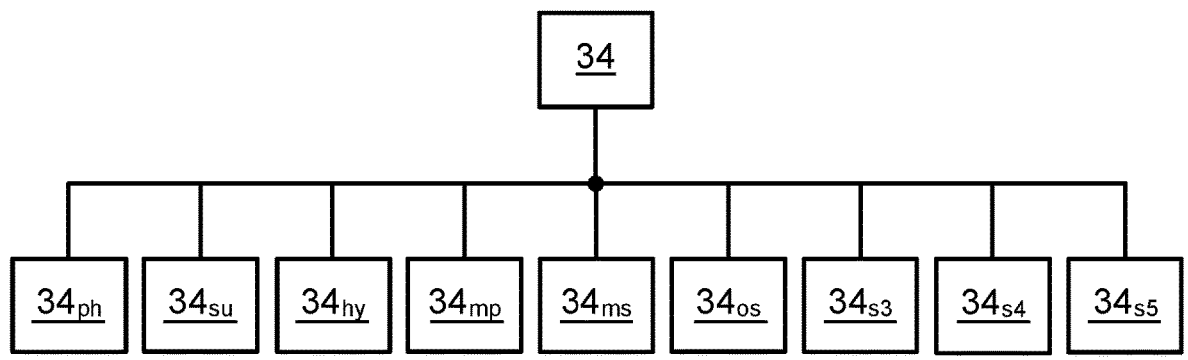
FIG. 7 is a block diagram showing various anions of a first ion type.

FIG. 7 shows a block diagram of various anions of the first ion type 34. For example, the anions of the first ion type 34 may be at least one of a phosphate ($PO_4^{3-}$) $34_{ph}$, a sulphate ($SO_4^{2-}$) $34_{su}$, a hydroxide ($OH^-$) $34_{hy}$, a methyl phosphate (($CH_3$)$PO_4^{2-}$) $34_{mp}$, a metastannate ($SnO_3^{2-}$) $34_{ms}$, an orthostannate ($SnO_4^{4-}$) $34_{os}$, a tricoordinated silicate ($SiO_3^{2-}$) $34_{s3}$, a tetracoordinated silicate ($SiO_4^{4-}$) $34_{s4}$ and a pentacoordinated silicate ($SiO_5^{6-}$) $34_{s5}$.

The second layer 40 (and/or the metal 42) is selected, blended, formulated or configured such that it contains cations of a second ion type 44 at the second bonding surface 46, and/or is capable of liberating cations of a second ion type 44 at the second bonding surface 46. These cations of the second ion type 44 may be available in free ionic/cationic form within the second layer/metal 40, 42, or they may be in combined/compound form (i.e., combined with anions) but with the capability of being liberated into ionic/cationic form via the application of heat. These cations of the second ion type 44 are disposed such that they are at least at or very near the second bonding surface 46 of the second layer 40, but they may also be disposed or dispersed throughout some or all of the thickness of the second layer 40.

Figure 9:
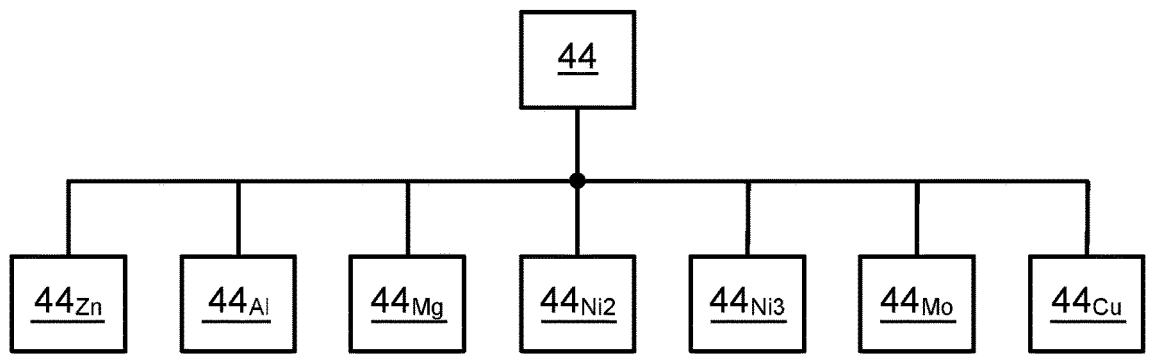
FIG. 9 is a block diagram showing various cations of a second ion type.

FIG. 9 shows a block diagram of various cations of the second ion type 44. For example, the cations of the second ion type 44 may be at least one of zinc(II) ($Zn^{2+}$) $44_{zn}$, aluminum(III) ($Al^{3+}$) $44_{Al}$, magnesium(II) ($Mg^{2+}$) $44_{Mg}$, nickel(II) ($Ni^{2+}$) $44_{Ni2}$, nickel(III) ($Ni^{3+}$) $44_{Ni3}$, molybdenum(III) ($Mo^{3+}$) $44_{Mo}$ and copper(II) ($Cu^{2+}$) $44_{Cu}$.

(Note that as used herein, reference numeral 34 may refer to one or more anions and/or to one or more first ion types, and reference numeral 44 may refer to one or more cations and/or to one or more second ion types. The anions of the first ion type 34 may be considered as electron donors, while the cations of the second ion type 44 may be considered as electron acceptors. Further, note that while zinc anions typically have a 2+ charge, aluminum anions typically have a 3+ charge, and magnesium anions typically have a 2+ charge, when these anions are expressed herein by systematic name rather than by molecular formula, the appropriate roman numeral designation—indicating the anion's charge—is included following the name of the anion. Thus, Zn(OH)$_2$ is referred to herein as "zinc(II) hydroxide" rather than by its more commonly known name of "zinc hydroxide".)

After the first and second layers 30, 40 are brought together with the first bonding surface 36 in contact with the second bonding surface 46 to form the "sandwich" as shown in FIG. 2, heat may be applied to the sandwich to produce the polymer-metal sandwich structure 20 shown in FIG. 3. According to this embodiment, the polymer-metal sandwich structure 20 includes: (i) a first layer 30 made of a polymer 32 and having a first bonding surface 36, wherein the first layer 30 contains or is capable of liberating anions of the first ion type 34 at the first bonding surface 36; (ii) a second layer 40 made of a metal 42 and having a second bonding surface 46, wherein the second layer 40 contains or is capable of liberating cations of the second ion type 44 at the second bonding surface 46; and (iii) a third layer 50 sandwiched between and in contact with the first and second bonding surfaces 36, 46, wherein the third layer 50 is made of a flame retardant 52 formed of anions of the first ion type 34 and cations of the second ion type 44.

The flame retardant 52 may be formed by sandwiching together the first and second layers 30, 40 with their respective first and second bonding surfaces 36, 46 disposed in contact with each other (as illustrated in FIG. 2) and applying heat to the first and/or second layers 30, 40 so as to elevate the temperature of at least the first bonding surface 36 to at least the melting temperature of the polymer 32. Upon formation of the third layer 50 of flame retardant 52, the third layer 50 may have a third surface 54 in contact with the first layer 30 and a fourth surface 56 in contact with the second layer 40.

Figure 10:
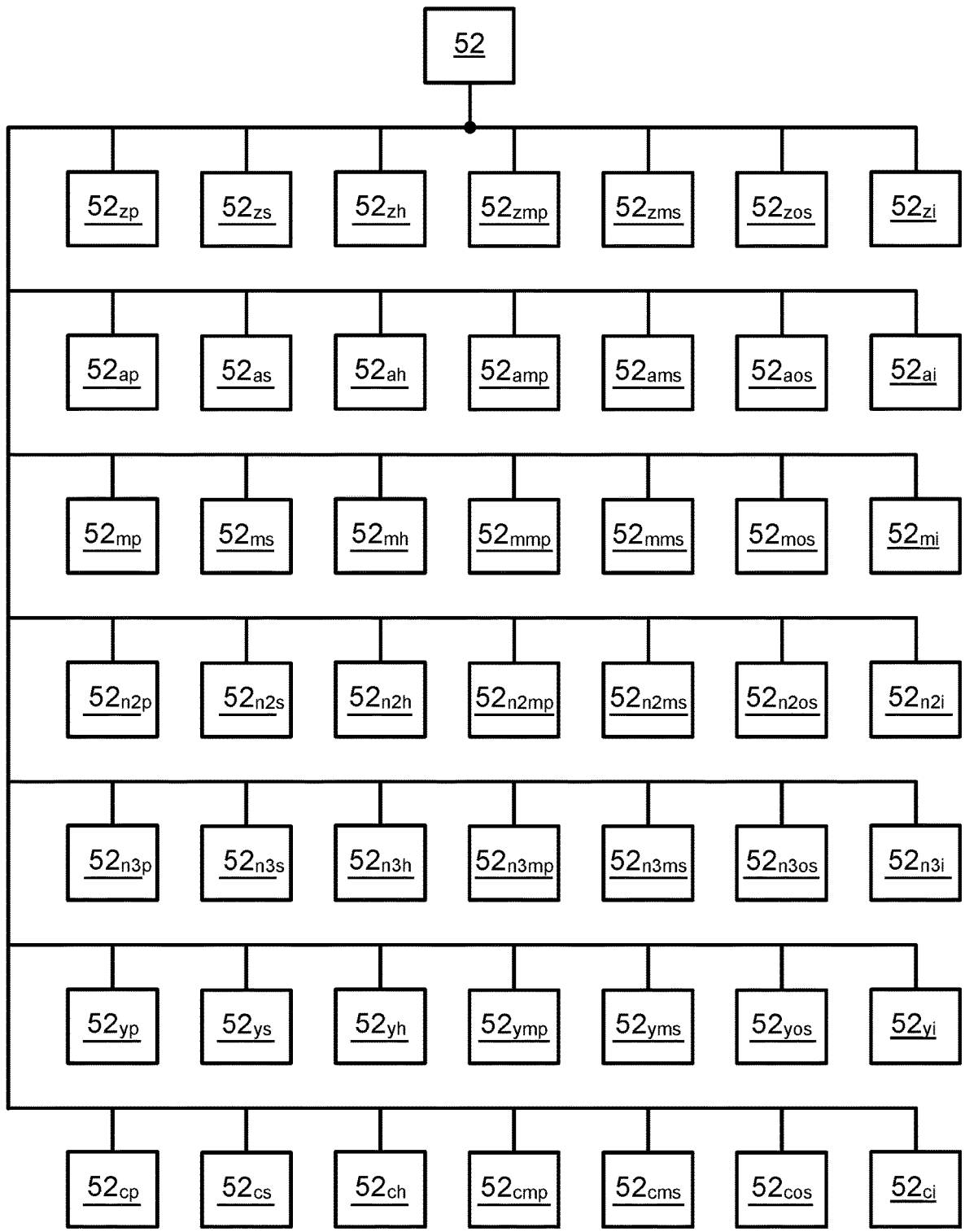
FIG. 10 is a block diagram showing various flame retardants formed from an anion of the first ion type and a cation of the second ion type.

FIG. 10 shows a block diagram of various flame retardants 52 which may be formed from of anions of the first ion type 34 (shown in FIG. 7) and cations of the second ion type 44 (shown in FIG. 9). For example, the flame retardant 52 that is produced may be at least one of $Zn_3(PO_4)_2$ (zinc(II) phosphate) $52_{zp}$, $Zn_3(SO_4)_2$ (zinc(II) sulfate) $52_{zs}$, $Zn(OH)_2$ (zinc(II) hydroxide) $52_{zh}$, $Zn(CH_3)PO_4$ (zinc(II) methyl phosphate) $52_{zmp}$, $ZnSnO_3$ (zinc(II) metastannate) $52_{zms}$, $Zn_2SnO_4$ (zinc(II) orthostannate) $52_{zos}$, $Zn_2SiO_4$ (zinc(II) silicate) $52_{zi}$, $AlPO_4$ (aluminum(III) phosphate) $52_{ap}$, $Al_2(SO_4)_3$ (aluminum(III) sulfate) $52_{as}$, $Al(OH)_3$ (aluminum (III) hydroxide) $52_{ah}$ (also known as aluminum trihydroxide or "ATH"), $Al_2(CH_3PO_4)_3$ (aluminum(III) methyl phosphate) $52_{amp}$, $Al_2(SnO_3)_3$ (aluminum(III) metastannate) $52_{ams}$, $Al_4(SnO_4)_3$ (aluminum(III) orthostannate) $52_{aos}$, $Al_2SiO_5$ (aluminum(III) silicate) $52_{ai}$, $Mg_3(PO_4)_2$ (magnesium(II) phosphate) $52_{mp}$, $MgSO_4$ (magnesium(II) sulfate) 52 ms, $Mg(OH)_2$ (magnesium(II) hydroxide) $52_{mh}$ (also known as magnesium dihydroxide or "MDH"), $Mg(CH_3)PO_4$ (magnesium(II) methyl phosphate) $52_{mmp}$, $MgSnO_3$ (magnesium(II) metastannate) $52_{mms}$, $Mg_2SnO_4$ (magnesium(II) orthostannate) $52_{mos}$, $Mg_2SiO_4$ (magnesium(II) silicate) $52_{mi}$, $Ni_3(PO_4)_2$ (nickel(II) phosphate) $52_{n2p}$, $NiPO_4$ (nickel(III) phosphate) $52_{n3p}$, $NiSO_4$ (nickel(II) sulfate) $52_{n2s}$, $Ni_2(SO_4)_3$ (nickel(III) sulfate) $52_{n3s}$, $Ni(OH)_2$ (nickel (II) hydroxide) $52_{n2h}$, $Ni(OH)_3$ (nickel(III) hydroxide) $52_{n3h}$, $Ni(CH_3)PO_4$ (nickel(II) methyl phosphate) $52_{n2mp}$, $Ni_2(CH_3PO_4)_3$ (nickel(III) methyl phosphate) $52_{n3mp}$, $NiSnO_3$ (nickel(II) metastannate) $52_{n2ms}$, $Ni_2(SnO_3)_3$ (nickel(III) metastannate) $52_{n3ms}$, $Ni_2SnO_4$ (nickel(II) orthostannate) $52_{n2os}$, $Ni_4(SnO_4)_3$ (nickel(III) orthostannate) $52_{n3os}$, $NiSiO_3$ (nickel(II) silicate) $52_{n2i}$, $Ni_2SiO_4$ (nickel(III) silicate) $52_{n3i}$, $MoPO_4$ (molybdenum(III) phosphate) $52_{yp}$, $Mo_2(SO_4)_3$ (molybdenum(III) sulfate) $52_{ys}$, $Mo(OH)_3$ (molybdenum(III) hydroxide) $52_{yh}$, $MO_2(CH_3PO_4)_3$ (molybdenum (III) methyl phosphate) $52_{ymp}$, $Mo_2(SnO_3)_3$ (molybdenum (III) metastannate) $52_{yms}$, $Mo_4(SnO_4)_3$ (molybdenum(III) orthostannate) $52_{yos}$, $Mo_4(SiO_4)_3$ (molybdenum(III) silicate) $52_{yi}$, $Cu_3(PO_4)_2$ (copper(II) phosphate) $52_{cp}$, $CuSO_4$ (copper (II) sulfate) $52_{es}$, $Cu(OH)_2$ (copper(II) hydroxide) $52_{ch}$, $Cu(CH_3)PO_4$ (copper(II) methyl phosphate) $52_{emp}$, $CuSnO_3$ (copper(II) metastannate) $52_{ems}$, $Cu_2SnO_4$ (copper(II) orthostannate) $52_{cos}$ and $Cu_2SiO_4$ (copper(II) silicate) $52_{ci}$. These flame retardants 52, along with the anions of the first ion type 34 and the cations of the second ion type 44 from which the flame retardants 52 are formed, are summarized below in TABLE 1.

TABLE 1

First Ion Type Anions, Second Ion Type Cations and Flame Retardants Formed Therefrom

| | Phosphate $PO_4^{3-}$ | Sulfate $SO_4^{2-}$ | Hydroxide $OH^-$ | Methyl Phosphate $(CH_3)PO_4^{2-}$ | Stannate $SnO_3^{2-}$, $SnO_4^{4-}$ | Silicate $SiO_3^{2-}$, $SiO_4^{4-}$, $SiO_5^{6-}$ |
|---|---|---|---|---|---|---|
| $Zn^{2+}$ | $Zn_3(PO_4)_2$ | $ZnSO_4$ | $Zn(OH)_2$ | $Zn(CH_3)PO_4$ | $ZnSnO_3$, $Zn_2SnO_4$ | $Zn_2SiO_4$ |
| $Al^{3+}$ | $AlPO_4$ | $Al_2(SO_4)_3$ | $Al(OH)_3$ | $Al_2(CH_3PO_4)_3$ | $Al_2(SnO_3)_3$, $Al_4(SnO_4)_3$ | $Al_2SiO_5$ |
| $Mg^{2+}$ | $Mg_3(PO_4)_2$ | $MgSO_4$ | $Mg(OH)_2$ | $Mg(CH_3)PO_4$ | $MgSnO_3$, $Mg_2SnO_4$ | $Mg_2SiO_4$ |
| $Ni^{2+}$, $Ni^{3+}$ | $Ni_3(PO_4)2$, $NiPO_4$ | $NiSO_4$, $Ni2(SO_4)_3$ | $Ni(OH)_2$, $Ni(OH)_3$ | $Ni(CH_3)PO_4$, $Ni_2(CH_3PO_4)_3$ | $NiSnO_3$, $Ni_2(SnO_3)_3$, $Ni_2SnO_4$, $Ni_4(SnO_4)_3$ | $NiSiO_3$, $Ni_2SiO_4$ |
| $Mo^{3+}$ | $MoPO_4$ | $Mo_2(SO_4)_3$ | $Mo(OH)_3$ | $Mo_2(CH_3PO_4)_3$ | $Mo_2(SnO_3)_3$, $Mo_4(SnO_4)_3$ | $Mo_4(SiO_4)_3$ |
| $Cu^{2+}$ | $Cu_3(PO_4)_2$ | $CuSO_4$ | $Cu(OH)_2$ | $Cu(CH_3)PO_4$ | $CuSnO_3$, $Cu_2SnO_4$ | $Cu_2SiO_4$ |

Figure 4:
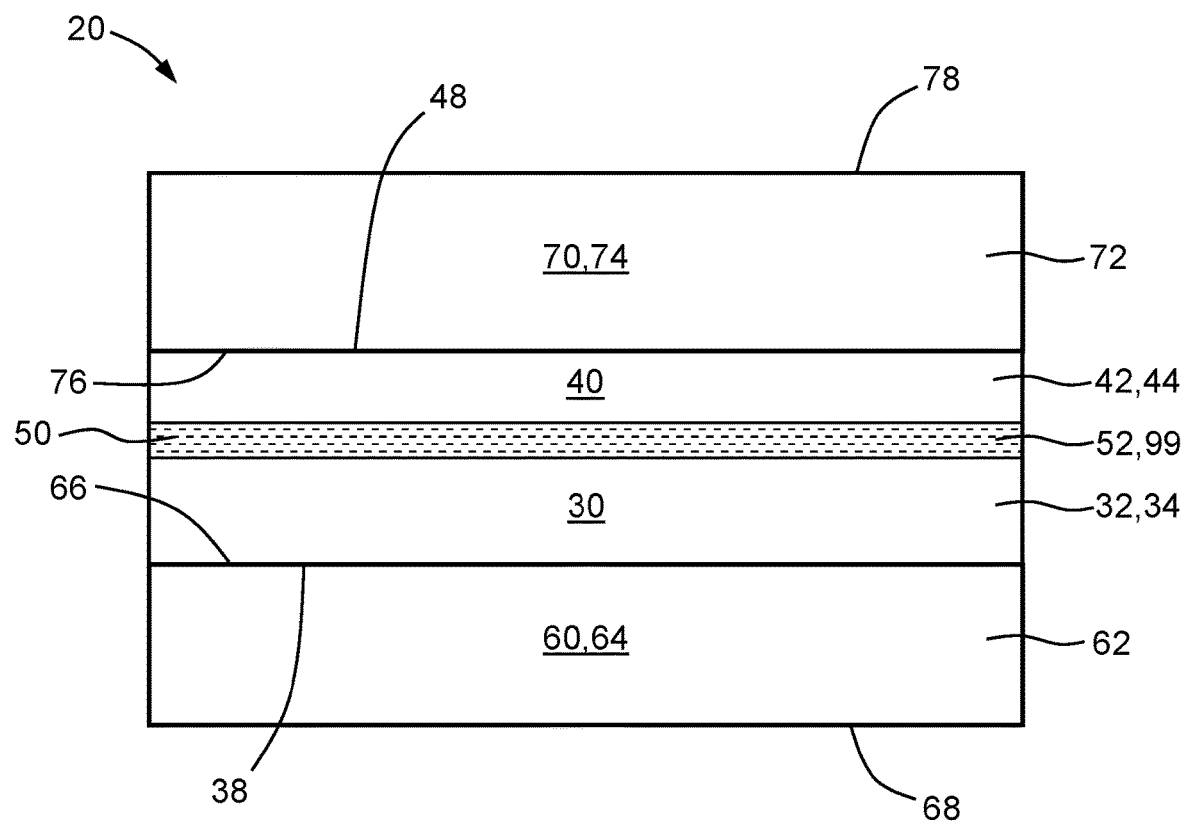
FIG. 4 is a schematic side view of an alternative embodiment of the polymer-metal sandwich structure.

FIG. 4 shows a schematic side view of an alternative embodiment of the polymer-metal sandwich structure 20. The polymer-metal sandwich structure 20 shown here is similar to that shown in FIG. 3, but further includes a fourth layer 60 made of a second polymer 62, wherein the fourth layer 60 is bonded with or affixed to the first layer 30 and is configured as a first structural member 64. As shown, the fourth layer 60 has opposed fifth and sixth surfaces 66, 68, and the first non-bonding surface 38 of the first layer 30 may be bonded with or affixed to the fifth surface 66 of the fourth layer 60. Optionally, the second polymer 62 of the fourth layer 60 may be the same as the polymer 32 of the first layer 30. The polymer-metal sandwich structure 20 of FIG. 4 may further include a fifth layer 70 made of a second metal 72, wherein the fifth layer 70 is bonded with or affixed to the second layer 40 and is configured as a second structural member 74. As shown, the fifth layer 70 has opposed seventh and eighth surfaces 76, 78, and the second non-bonding surface 48 of the second layer 40 may be bonded with or affixed to the seventh surface 76 of the fifth layer 70. Optionally, the second metal 72 of the fifth layer 70 may be the same as the metal 42 of the second layer 40.

Figure 11:
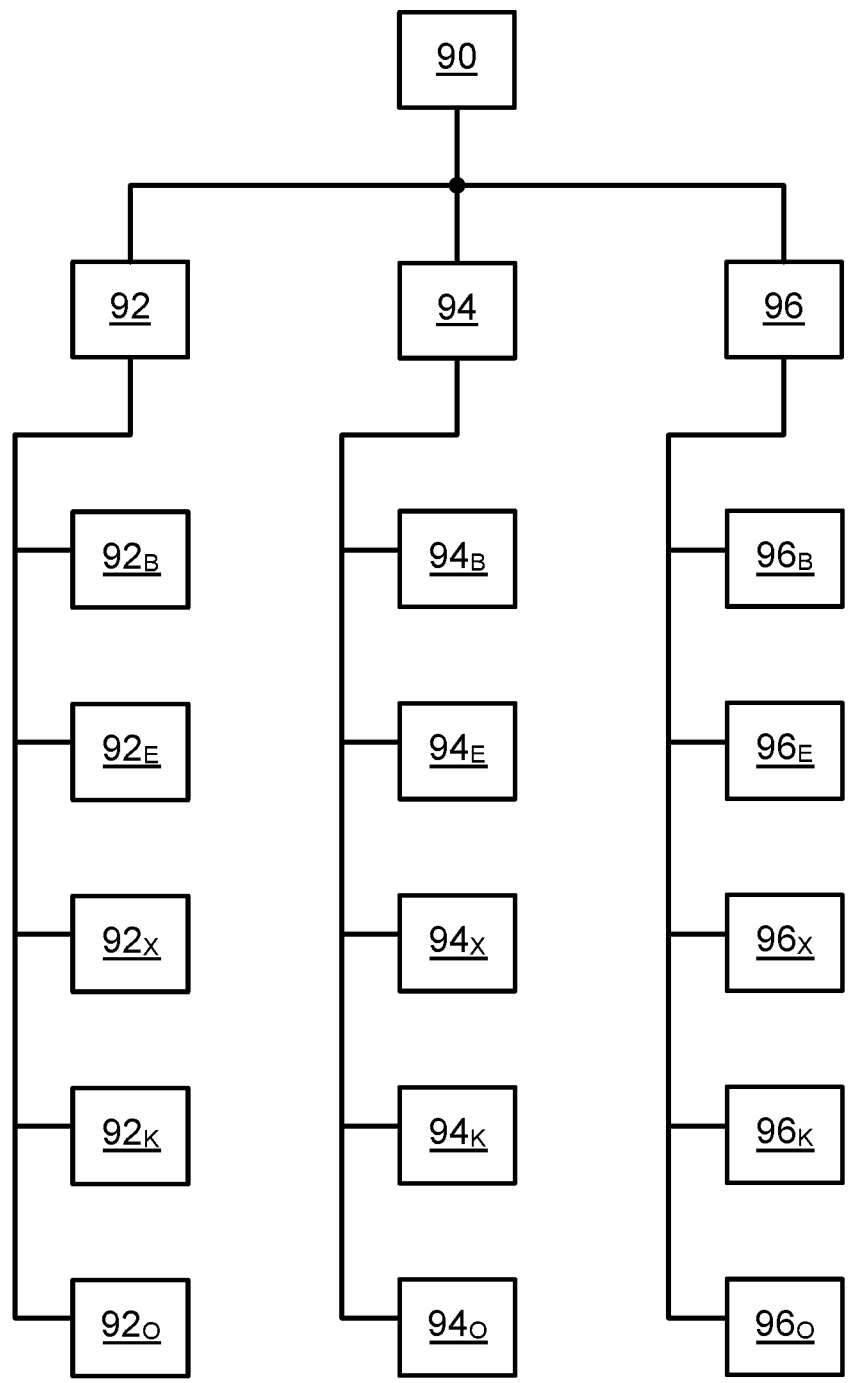
FIG. 11 is a block diagram showing various embodiments of the polymer-metal sandwich structure configured as at least one of a support tray, an enclosure and a cover.

As used herein, each of the first and second structural members 64, 74 is a structural member 90 which may be used to support and/or protect a first object 80. As shown in the block diagram of FIG. 6, the first object 80 may be a battery $80_B$, an electronic device or component $80_E$ (such as an engine control unit (ECU) module in an automotive vehicle, a printed circuit board (PCB), a thermal/thermoelectric charger, an inverter, etc.), an exhaust component $80_X$ (such as an output manifold, catalytic converter, exhaust pipe, etc.), a brake component $80_K$ (such as a brake rotor, braker drum, brake assembly, etc.), or any other heat-producing or heat- and/or flame-sensitive element, device or assembly $80_O$ (such as an engine, a wiring harness, a solar panel device, a fuse box, a sensor, a drive unit with gears and an inverter, etc.) As shown in the block diagram of FIG. 11, the structural member 90 which protects and/or supports the first object 80 may be one or more of (i) a support tray 92 (e.g., a bottom cover disposed underneath the first object 80), (ii) one or more walls 94 (e.g., a partial or full enclosure covering one or more sides of the first object 80), and (iii) a cover or lid 96 (e.g., a top cover disposed above or on top of the first object 80, or an end cap disposed proximate one end of the first object 80). For example, as shown in FIG. 11, the structural member 90 may be one or more of a support tray $92_B$, wall(s) $94_B$ or lid $96_B$ for a battery $80_B$, a support tray $92_E$, wall(s) $94_E$ or lid $96_E$ for an electronic device or component $80_E$, a support tray $92_X$, wall(s) $94_X$ or lid $96_X$ for an exhaust component $80_X$, a support tray $92_K$, wall(s) $94_K$ or lid $96_K$ for a braking component $80_K$, and a support tray $92_O$, wall(s) $94_O$ or lid $96_O$ for any other type of heat-producing, heat-sensitive or flame-sensitive object $80_O$.

The support tray 92, wall(s) 94 lid/cover 96 may be arranged so as to form a partial or full enclosure that covers, protects and/or supports one or more of the top, bottom and side(s) of the first object 80. Further, in any of the configurations described herein, the polymer-metal sandwich structure 20 may be configured as at least one of (i) a support tray 92, (ii) one or more walls 94, and (iii) a lid/cover 96, so as to form a partial or full enclosure that covers, protects and/or supports one or more of the top, bottom and side(s) of the first object 80. One or more of the support tray 92, one or more walls 94 and lid/cover 96 may be formed or made contiguous with each other, and optionally may be fastened or attached with each other.

Figure 5:
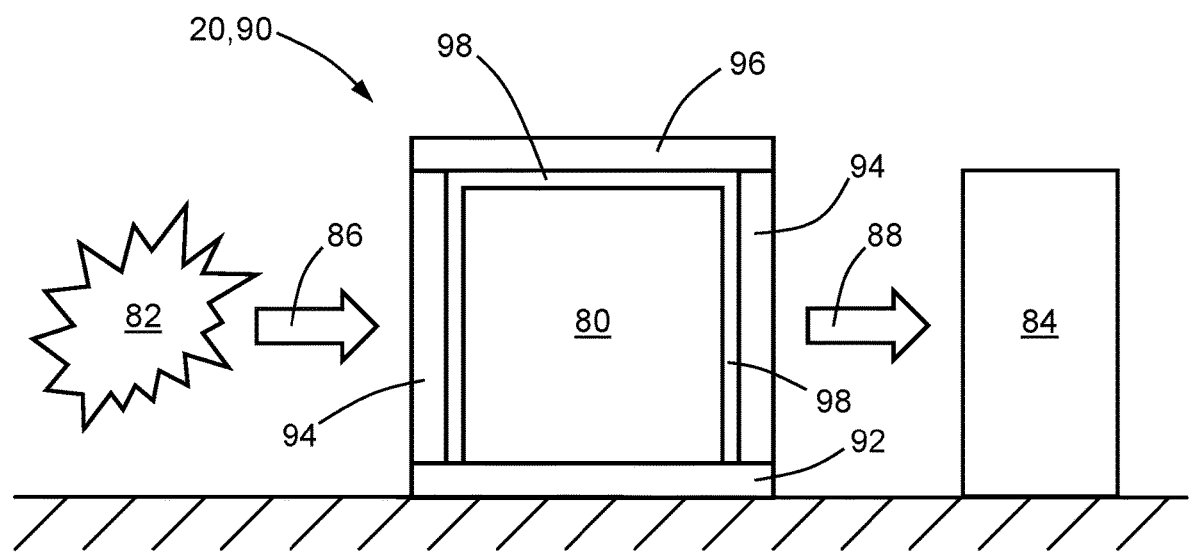
FIG. 5 is a schematic side view of the polymer-metal sandwich structure in an exemplary use environment.

FIG. 5 shows a schematic side view of the polymer-metal sandwich structure 20 in an exemplary use environment. A first object 80 (such as a battery) is supported atop a support tray 92, and is enclosed around its front, rear, left and right sides by walls 94 which also rest atop the support tray 92. A lid or cover 96 is disposed atop the walls 94 and above the first object 80, and an air gap 98 is provided between the first object 80 and the walls 94, and between the first object 80 and the lid or cover 96. Together, these structural members 90 (i.e., the support tray 92, walls 94 and lid/cover 96) form an enclosure which completely encloses the first object 80. The support tray 92, the walls 94 and the lid/cover 96 may each be considered as a structural member 90, and the collection of these elements together may also be considered as a structural member 90.

In FIG. 5, the first object 80 and structural member(s) 90 are shown in an environment where an external flame source 82 is situated nearby, with a first potential flame path 86 shown which extends from the external flame source 82 to the first object/structural member(s) 80, 90. (The external flame source 82 may be a battery, engine, exhaust manifold, braking system, furnace, boiler, etc.) Also shown is a second object 84 which is flame-sensitive, with a second potential flame path 88 shown which extends from the first object/structural member(s) 80, 90 to the second object 84. While not shown explicitly in FIG. 5, it should be understood that each of the structural members 90, 92, 94, 96 is constructed as a polymer-metal sandwich structure 20. In this exemplary arrangement, the polymer-metal sandwich structure 20 of the structural members 90, 92, 94, 96 not only encloses the first object 80, but also provides potential flame protection from the nearby external flame source 82 due to the inner/third layer 50 of flame retardant 52 which is sandwiched between the first and second layers 30, 40 within each of the structural members 90, 92, 94, 96. Also, the polymer-metal sandwich structure 20 of the wall 94 that is located between the first and second objects 80, 84 helps to provide potential flame protection to the second object 84 should the first object 80 ignite or emit any flames within the enclosure.

In each of the configurations shown, the flame retardant 52 may be effective for preventing and/or slowing an ignition and/or a spreading of a flame, within and/or through one or both of the first and second layers 30, 40. Thus, the third layer 50 of flame retardant 52 may serve as an in situ-formed flame barrier.

Turning again to FIGS. 1-2, the polymer-metal sandwich structure 20 may further include an electron donor additive 33 dispersed or disposed within the first layer 30. The electron donor additive 33 may be dispersed or disposed within a first bonding volume 39 of the first layer 30, which extends from the first bonding surface 36 to a first depth Di into the first layer 30. The electron donor additive 33 is selected, blended, formulated or configured such that it contains and/or is capable of liberating anions of the first ion type 34. Examples of electron donor additives 33 include NaOH, $Na_2SO_4$ and $Ca_3(PO4)_2$, which contain and/or are capable of liberating hydroxide ions ($OH^-$) $34_{hy}$, sulfate ions ($SO_4^{2-}$) $34_{su}$ and phosphate ions ($PO_4^{3-}$) $34_{ph}$, respectively. Electron donor additives 33 may be physically and/or may be chemically mixed or added to the first bonding volume 39, such as by blending the electron donor additive 33 (in powder or pellet form) into the polymer 32 or its starting constituents. (Polymers 32 which are thermoplastic in nature may also be in powder or pellet form, and polymers 32 which are thermoset in nature—including the constituents or starting materials for making polymers 32 which are thermoset in nature—may be in powder, pellet, paste, gel or liquid form. For example, polymers 32 which are thermoset epoxy resins may utilize constituents or starting materials such as a monomeric resin, a hardener, an accelerator and a plasticizer.)

Figure 12:
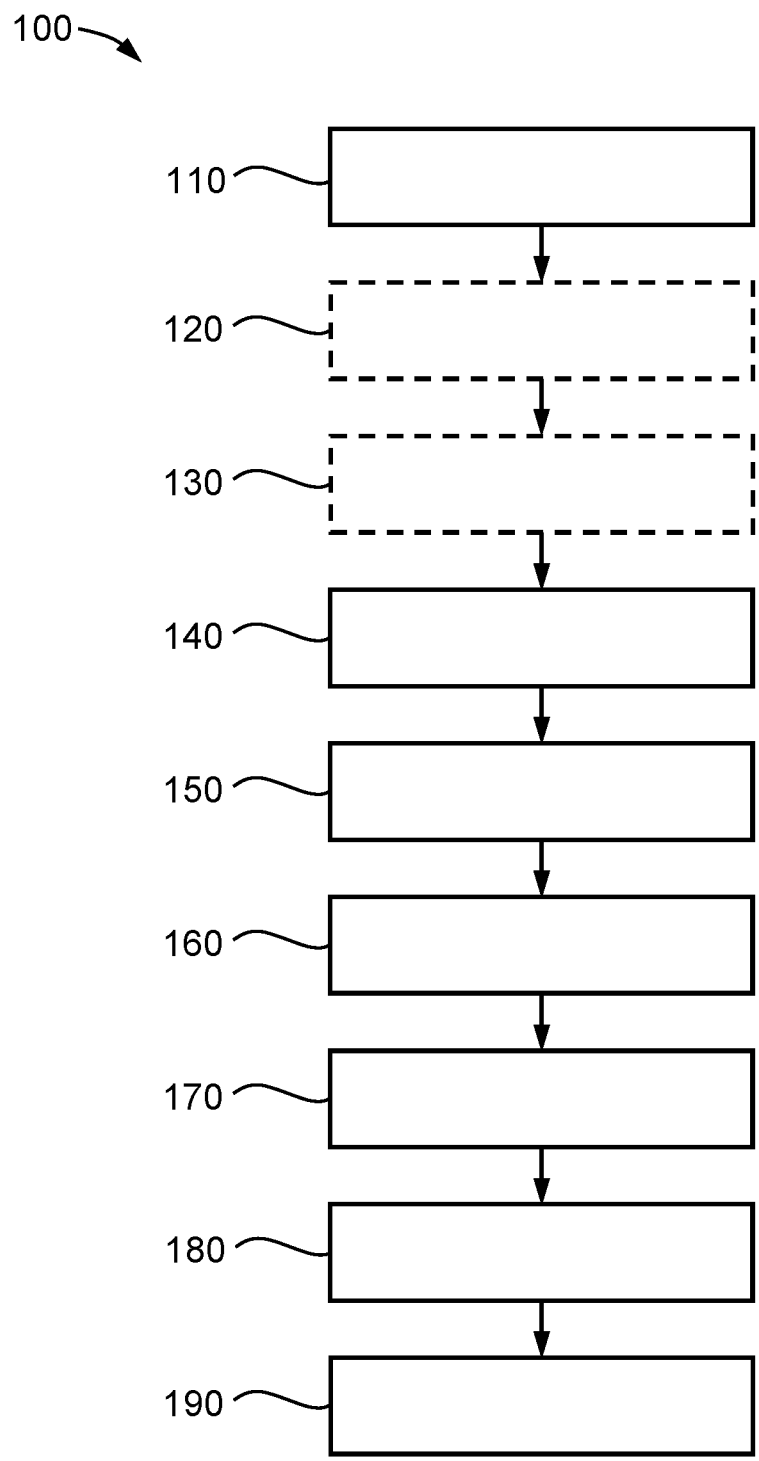
FIG. 12 is a flowchart for a method of manufacturing the polymer-metal sandwich structure.

FIG. 12 shows a flowchart of another embodiment, in which a method 100 of manufacturing the polymer-metal sandwich structure 20 is shown. As noted below, some of the actions described herein (which are represented as rectangles or blocks in the flowchart) are optional. At block 140, a first layer 30 of polymer 32 and a second layer 40 of metal 42 are sandwiched together, such that a first bonding surface 36 of the first layer 30 is disposed in contact with a second bonding surface 46 of the second layer 40. Here, the polymer 32 contains or is capable of liberating anions of a first ion type 34 at the first bonding surface 36, and the metal 42 contains or is capable of liberating cations of a second ion type 44 at the second bonding surface 46. At block 160, heat is applied to the first and/or second layers 30, 40 so as to elevate the temperature of the first bonding surface 36 to at least the melting temperature of the polymer 32. And at block 170, a third layer 50 of flame retardant 52 is formed between the first and second bonding surfaces 36, 46 from the applied heat and from anions of the first ion type 34 and cations of the second ion type 44. The third layer 50 of flame retardant 52 is thus formed in situ at the interface 99 between the first and second bonding surfaces 36, 46.

The method 100 may further include, at block 110, dispersing or disposing an electron donor additive 33 within a first bonding volume 39 of the first layer 30, with the first bonding volume 39 extending from the first bonding surface 36 to a first depth Di into the first layer 30, wherein the electron donor additive 33 contains or is capable of liberating anions of the first ion type 34. The method 100 may optionally include, at block 150, exerting pressure on the sandwiched first and second layers 30, 40, so as to urge or assist in the formation of molecules of flame retardant 52 from the anions 34 and cations 44 present at or near the first and second bonding surfaces 36, 46. Additionally, the method 100 may further optionally include, at block 180, releasing the pressure exerted in block 150, and/or, at block 190, removing the heat applied in block 160.

The method 100 may further optionally include, at block 120, bonding a fourth layer 60 made of a second polymer 62 to the first layer 30, wherein the fourth layer 60 is configured as a first structural member 64. This bonding of the fourth and first layers 60, 30 may be effected by transfer molding, overmolding, co-molding, adhesive bonding or the like. Additionally, the method 100 may also optionally include, at block 130, adding a fifth layer 70 made of a second metal 72 to the second layer 40, wherein the fifth layer 70 is coated or plated onto the second layer 40 and is configured as a second structural member 74. Note that blocks 120 and 130 are shown as dashed rectangles in the flowchart; this is to indicate that the positions or order of these two blocks, as shown within the overall flow of the method 100, are optional, as one or both of blocks 120 and 130 may be moved to other positions in the overall flow of the method 100 as well. For example, one or both of the blocks 120, 130 may be positioned before block 110, between blocks 140 and 150, or after block 190. In any of the above configurations or sequences of the method 100, a polymer-metal sandwich structure 20 is produced.

According to a further embodiment, a polymer-metal sandwich structure 20 includes: (i) a first layer 30 made of a polymer 32 and having a first bonding surface 36, wherein an electron donor additive 33 containing or capable of liberating anions of a first ion type 34 is disposed within a first bonding volume 39 of the first layer 30 extending from the first bonding surface 36 to a first depth Di into the first layer 30, wherein the first layer 30 contains or is capable of liberating anions of the first ion type 34 at the first bonding surface, wherein the first ion type 34 is at least one of a phosphate $34_{ph}$, a sulfate $34_{su}$, a hydroxide $34_{hy}$, a methyl phosphate $34_{mp}$, a metastannate $34_{ms}$, an orthostannate $34_{os}$, a tricoordinated silicate $34_{s3}$, a tetracoordinated silicate $34_{s4}$ and a pentacoordinated silicate $34_{s5}$; (ii) a second layer 40 made of a metal 42 and having a second bonding surface 46, wherein the second layer 40 contains or is capable of liberating cations of a second ion type 44 at the second bonding surface 46, wherein the second ion type 44 is at least one of a zinc(II) cation $44_{Zn}$, an aluminum(III) cation $44_{Al}$, a magnesium(II) cation $44_{Mg}$, a nickel(II) cation $44_{Ni2}$, a nickel(III) cation $44_{Ni3}$, a molybdenum(III) cation $44_{Mo}$ and a copper(II) cation $44_{Cu}$; and (iii) a third layer 50 sandwiched between and in contact with the first and second bonding surfaces 36, 46, wherein the third layer 50 is made of a flame retardant 52 formed of anions of the first ion type 34 and cations of the second ion type 44.

In this embodiment, the flame retardant 52 may be at least one of zinc(II) phosphate $52_{zp}$, zinc(II) sulfate $52_{zs}$, zinc(II) hydroxide $52_{zh}$, zinc(II) methyl phosphate $52_{zmp}$, zinc(II) metastannate $52_{zms}$, zinc(II) orthostannate $52_{zos}$, zinc(II) silicate $52_{zi}$, aluminum(III) phosphate $52_{ap}$, aluminum(III)

sulfate $52_{as}$, aluminum(III) hydroxide $52_{ah}$, aluminum(III) methyl phosphate $52_{amp}$, aluminum(III) metastannate $52_{ams}$, aluminum(III) orthostannate $52_{aos}$, aluminum(III) silicate $52_{ai}$, magnesium(II) phosphate $52_{mp}$, magnesium(II) sulfate $52_{ms}$, magnesium(II) hydroxide $52_{mh}$, magnesium(II) methyl phosphate $52_{mmp}$, magnesium(II) metastannate $52_{mms}$, magnesium(II) orthostannate $52_{mos}$, magnesium(II) silicate $52_{mi}$, nickel (II) phosphate $52_{n2p}$, nickel (II) sulfate $52_{n2s}$, nickel (II) hydroxide $52_{n2h}$, nickel (II) methyl phosphate $52_{n2mp}$, nickel (II) metastannate $52_{n2ms}$, nickel (II) orthostannate $52_{n2os}$, nickel (II) silicate $52_{n2i}$, nickel (III) phosphate $52_{n3p}$, nickel (III) sulfate $52_{n3s}$, nickel (III) hydroxide $52_{n3h}$, nickel (III) methyl phosphate $52_{n3mp}$, nickel (III) metastannate $52_{n3ms}$, nickel (III) orthostannate $52_{n3os}$, nickel (III) silicate $52_{n3i}$, molybdenum (III) phosphate $52_{yp}$, molybdenum (III) sulfate $52_{ys}$, molybdenum (III) hydroxide $52_{yh}$, molybdenum (III) methyl phosphate $52_{ymp}$, molybdenum (III) metastannate $52_{yms}$, molybdenum (III) orthostannate $52_{yos}$, molybdenum (III) silicate $52_{yi}$, copper (II) phosphate $52_{cp}$, copper (II) sulfate $52_{es}$, copper (II) hydroxide $52_{ch}$, copper (II) methyl phosphate $52_{cmp}$, copper (II) metastannate $52_{cms}$, copper (II) orthostannate $52_{cos}$, and copper (II) silicate $52_{ei}$.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A polymer-metal sandwich structure, comprising:
a first layer made of a polymer and having a first bonding surface, wherein an electron donor additive is dispersed within a first bonding volume of the first layer extending from the first bonding surface to a first depth into the first layer, wherein the electron donor additive contains or is configured to liberate anions of a first ion type;
a second layer made of a metal and having a second bonding surface, wherein the second layer contains or is configured to liberate cations of a second ion type at the second bonding surface; and
a third layer sandwiched between and formed with the first and second bonding surfaces, wherein the third layer is made of a flame retardant formed of the polymer from the first layer, the anions of the first ion type, the metal from the second layer, and the cations of the second ion type, the third layer having a third surface in contact with the first layer and a fourth surface in contact with the second layer.

2. The polymer-metal sandwich structure of claim 1, wherein the flame retardant is formed by sandwiching together the first and second layers with the first and second bonding surfaces disposed in contact with each other and applying heat to the first and/or second layers so as to elevate the temperature of the first bonding surface to at least the melting temperature of the polymer.

3. The polymer-metal sandwich structure of claim 1, wherein the flame retardant is effective for preventing and/or slowing an ignition and/or a spreading of a flame within and/or through at least one of the first and second layers.

4. The polymer-metal sandwich structure of claim 1, wherein the first ion type includes $PO_4^{3-}$, $SO_4^{2-}$, $OH^-$, $(CH_3)PO_4^{2-}$, $SnO_3^{2-}$, $SnO_4^{4-}$, $SiO_3^{2-}$, $SiO_4^{4-}$, and/or $SiO_5^{6-}$.

5. The polymer-metal sandwich structure of claim 1, wherein the second ion type includes $Zn^{2+}$, $Al^{3+}$, $Mg^{2+}$, $Ni^{2+}$, $Ni^{3+}$, $Mo^{3+}$, and/or $Cu^{2+}$.

6. The polymer-metal sandwich structure of claim 1, wherein the flame retardant includes $Zn_3(PO_4)_2$, $Zn_3(SO_4)_2$, $Zn(OH)_2$, $Zn(CH_3)PO_4$, $ZnSnO_3$, $Zn_2SnO_4$, $Zn_2SiO_4$, $AlPO_4$, $Al_2(SO_4)_3$, $Al(OH)_3$, $Al_2(CH_3PO_4)_3$, $Al_2(SnO_3)_3$, $Al_4(SnO_4)_3$, $Al_2SiO_5$, $Mg_3(PO_4)_2$, $MgSO_4$, $Mg(OH)_2$, $Mg(CH_3)PO_4$, $MgSnO_3$, $Mg_2SnO_4$, $Mg_2SiO_4$, $Ni_3(PO_4)_2$, $NiPO_4$, $NiSO_4$, $Ni_2(SO_4)_3$, $Ni(OH)_2$, $Ni(OH)_3$, $Ni(CH_3)PO_4$, $Ni_2(CH_3PO_4)_3$, $NiSnO_3$, $Ni_2(SnO_3)_3$, $Ni_2SnO_4$, $Ni_4(SnO_4)_3$, $NiSiO_3$, $Ni_2SiO_4$, $MoPO_4$, $Mo_2(SO_4)_3$, $Mo(OH)_3$, $Mo_2(CH_3PO_4)_3$, $Mo_2(SnO_3)_3$, $Mo_4(SnO_4)_3$, $Mo_4(SiO_4)_3$, $Cu_3(PO_4)_2$, $CuSO_4$, $Cu(OH)_2$, $Cu(CH_3)PO_4$, $CuSnO_3$, $Cu_2SnO_4$ and/or $Cu_2SiO_4$.

7. The polymer-metal sandwich structure of claim 1, wherein the metal includes zinc, aluminum, magnesium, nickel, molybdenum, and/or copper.

8. The polymer-metal sandwich structure of claim 1, further comprising:
a fourth layer made of a second polymer, wherein the fourth layer is bonded with the first layer and is configured as a first structural member.

9. The polymer-metal sandwich structure of claim 8, wherein the second polymer of the fourth layer is the same as the polymer of the first layer.

10. The polymer-metal sandwich structure of claim 8, further comprising:
a fifth layer made of a second metal, wherein the fifth layer is bonded with the second layer and is configured as a second structural member.

11. The polymer-metal sandwich structure of claim 10, wherein the second metal of the fifth layer is the same as the metal of the second layer.

12. The polymer-metal sandwich structure of claim 1, wherein the polymer-metal sandwich structure is configured as: a support tray, one or more walls, and/or a lid.

13. The polymer-metal sandwich structure of claim 1, wherein the electron donor additive includes NaOH, $Na_2SO_4$ and/or $Ca_3(PO_4)_2$.

14. A polymer-metal sandwich structure, comprising:
a first layer made of a silicate polymer and having a first bonding surface;
an electron donor additive including NaOH, $Na_2SO_4$ and/or $Ca_3(PO_4)_2$ and containing or configured to liberate anions of a first ion type and disposed within a first bonding volume of the first layer extending from the first bonding surface to a first depth into the first layer, wherein the first ion type includes a phosphate, a sulfate, a hydroxide, a methyl phosphate, a metastannate, an orthostannate, a tricoordinated silicate, a tetracoordinated silicate, and/or a pentacoordinated silicate;
a second layer made of a zinc metal and having a second bonding surface, wherein the second layer contains or is configured to liberate cations of a second ion type at the second bonding surface, wherein the second ion type includes of a zinc(II) cation, an aluminum(III) cation, a magnesium(II) cation, a nickel(II) cation, a nickel(III) cation, a molybdenum(III) cation, and/or a copper(II) cation; and
a third layer sandwiched between and formed with the first and second bonding surfaces, wherein the third layer is made of a flame retardant formed of the polymer from the first layer, the anions of the first ion type, the metal from the second layer, and the cations of the second ion type.

15. The polymer-metal sandwich structure of claim 14, wherein the flame retardant includes zinc(II) phosphate, zinc(II) sulfate, zinc(II) hydroxide, zinc(II) methyl phosphate, zinc(II) metastannate, zinc(II) orthostannate, zinc(II) silicate.

16. A method of manufacturing a polymer-metal sandwich structure, the method comprising:
sandwiching together a first layer of polymer and a second layer of metal, such that a first bonding surface of the first layer is disposed in contact with a second bonding surface of the second layer, wherein an electron donor additive is dispersed within a first bonding volume of the first layer extending from the first bonding surface to a first depth into the first layer, wherein the electron donor additive contains or is configured to liberate anions of a first ion type, and the metal contains or is configured to liberate cations of a second ion type at the second bonding surface;
applying heat to the first and/or second layers so as to elevate the temperature of the first bonding surface to at least the melting temperature of the polymer; and
forming, from the applied heat, a third layer of flame retardant from the polymer from the first layer, the anions of the first ion type, the metal from the second layer, and the cations of the second ion type, the third layer formed from the first and second bonding surfaces, the third layer having a third surface in contact with the first layer and a fourth surface in contact with the second layer.

17. The method of claim 16, further comprising:
bonding a fourth layer made of a second polymer to the first layer, wherein the fourth layer is configured as a first structural member.

18. The method of claim 16, further comprising:
adding a fifth layer made of a second metal to the second layer, wherein the fifth layer is coated or plated onto the second layer and is configured as a second structural member.

* * * * *